United States Patent
Wright

(10) Patent No.: US 8,225,942 B2
(45) Date of Patent: Jul. 24, 2012

(54) SELF-CLEANING INFLUENT FEED SYSTEM FOR A WASTEWATER TREATMENT PLANT

(75) Inventor: Terry Wright, Rochester, NY (US)

(73) Assignee: Trans Terra Corporation, Rochester, NY (US)

( * ) Notice: Subject to any disclaimer, the term of this patent is extended or adjusted under 35 U.S.C. 154(b) by 436 days.

(21) Appl. No.: 12/685,875

(22) Filed: Jan. 12, 2010

(65) Prior Publication Data

US 2010/0108594 A1 May 6, 2010

Related U.S. Application Data

(63) Continuation-in-part of application No. 12/177,553, filed on Jul. 22, 2008, now Pat. No. 7,972,505.

(51) Int. Cl.
*B01D 21/00* (2006.01)
*B01D 21/34* (2006.01)

(52) U.S. Cl. ............. 210/519; 210/532.1; 210/533; 210/534; 210/535

(58) Field of Classification Search ........... 210/170.08, 210/519, 523, 532.1, 533, 534, 535, 801, 210/803
See application file for complete search history.

(56) References Cited

U.S. PATENT DOCUMENTS

| | | | |
|---|---|---|---|
| 4,693,821 A | 9/1987 | Goronszy et al. | |
| 4,775,467 A | 10/1988 | Calltharp et al. | |
| 4,891,128 A | 1/1990 | Goronszy | |
| 5,149,344 A | 9/1992 | Macy | |
| 5,435,924 A | 7/1995 | Albertson | |
| 5,503,747 A | 4/1996 | Vion et al. | |
| 5,587,067 A | 12/1996 | Love | |
| 6,773,593 B2 | 8/2004 | Young | |
| 7,025,888 B2 | 4/2006 | Thompson et al. | |
| 7,311,818 B1 | 12/2007 | Gurfinkel | |
| 2004/0074846 A1 | 4/2004 | Stever et al. | |
| 2006/0008865 A1 | 1/2006 | Cote et al. | |
| 2009/0236278 A1 | 9/2009 | Hoefken | |
| 2010/0018929 A1 | 1/2010 | Wright | |

FOREIGN PATENT DOCUMENTS

| | | | |
|---|---|---|---|
| JP | 09276606 A | 10/1997 | |
| JP | 2004-268005 A | 9/2004 | |
| KR | 20-2000-0019921 U | 11/2000 | |
| KR | 100406908 B1 | 11/2003 | |

*Primary Examiner* — Nam Nguyen
*Assistant Examiner* — Paul J Durand
(74) *Attorney, Agent, or Firm* — Harris Beach PLLC; Neal L. Slifkin

(57) ABSTRACT

An influent feed system for directing the influent liquid via hydraulic energy to scour the surface of primary treatment tank walls and base to move the scoured solids to a sludge trough. Scouring action takes place during periods of low liquid levels in the tank. The system comprises two identical, adjacent tanks sharing a common distribution box. Either or both of the tanks are in use at any given time. The tank in use will be empty occasionally each day. Influent feed troughs disposed transversely in each tank directs solids towards a sludge hopper in the tank bottom. The IFTs extend over the width of the tank to provide scouring of the entire end wall and floor surface. Each IFT has a sump with a valved discharge piped directly to the sludge trough, and the floor of each IFT is sloped towards the sump to facilitates draining of solids.

12 Claims, 2 Drawing Sheets

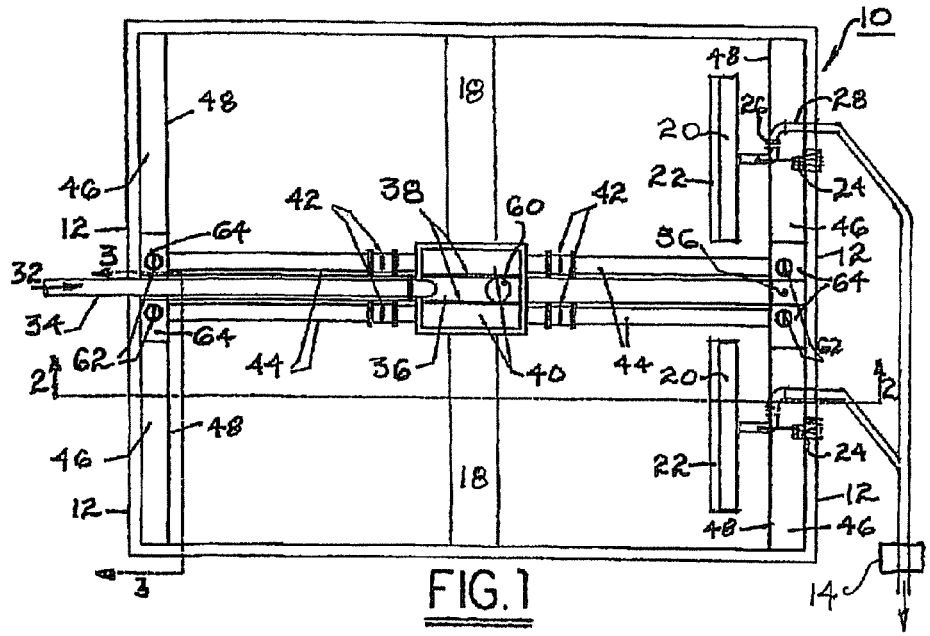
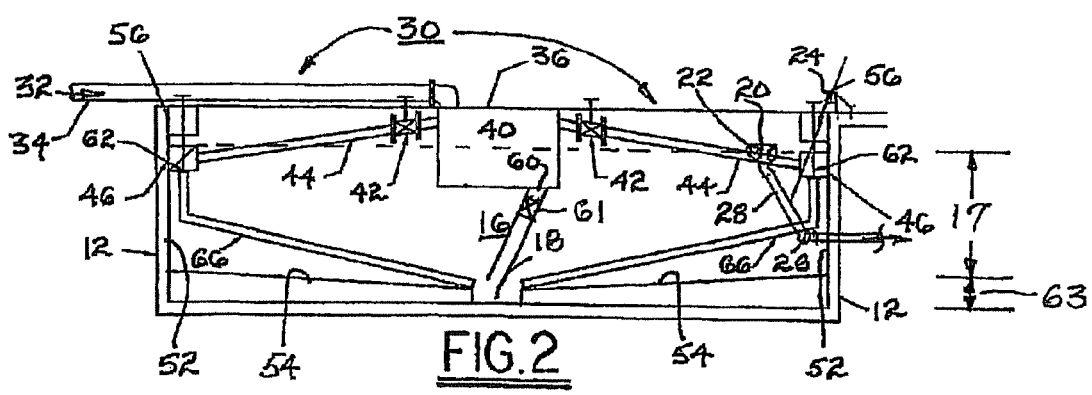

SELF-CLEANING INFLUENT FEED SYSTEM FOR A WASTEWATER TREATMENT PLANT

CROSS-REFERENCE TO RELATED APPLICATIONS

This application is a Continuation-In-Part of U.S. patent application Ser. No. 12/177,553, filed Jul. 22, 2008, now U.S. Pat. No. 7,972,505.

BACKGROUND OF THE INVENTION

The present invention relates to a system (apparatus and methods) for treatment of waste water streams; more particularly to a system for the primary treatment of waste water streams, including grit removal, flow equalization, fine screening, flow measurement, and primary clarification; and most particularly to a system for performing such functions in a single primary settling tank, wherein the tank is made to be self-flushing of settled solids on the tank walls and floor by the hydraulic force of the influent waste water stream.

Prior art wastewater treatment systems used in the industry generally include, but are not limited to, the following treatment processes: grit removal, fine screening, flow equalization, and primary clarification. The typical treatment processes are dependent on the velocity at which the waste water is moving through the system. Waste water, however, is not produced continually by humans, but instead is created in batch type processes, such as showering, flushing a toilet, or operating a washing machine. Such water consumptive activities are generally repetitive, resulting in daily, weekly, monthly, and yearly diurnal flow patterns for a specific waste water treatment system.

Grit removal is generally performed early in the treatment process in a grit chamber which is velocity sensitive having a design velocity of 1.0 to 3.0 feet per second. The most common method for removing grit is gravitational by reducing the velocity of the influent flow so that the grit settles out, or centrifugally by utilizing a circular channel/tank. The circular channel/tank is a hydro-cyclone that causes the grit to settle in a sump, separating the grit so that the organics can move forward to the biological processes. The grit is then pumped out of the sump to a grit washer and discharged to a dumpster for disposal at a landfill. This technology is subject to a large variation in influent flows.

Fine screening is typically accomplished by placing a screen in an influent channel. The influent channel must have a minimum velocity of 1.25 feet per second to keep solids from settling out in the channel and a maximum velocity of 3.0 feet per second to keep solids from being forced through the screen. Such a flow is difficult to maintain due to the large variation in diurnal and pumped flow patterns.

Primary clarifiers are also velocity sensitive having design requirements of 1,000 gallons per day per square foot and a minimum depth of 10 feet with the heavy solids settling to the base of the clarifier where they are pumped to a digester, the floatable solids, grease and scum being trapped and skimmed off the surface and the neutral buoyant solids/clarified wastewater exiting the basin via an effluent weir. Primary clarifiers are typically large tanks designed for gravity settling and may include electrical drives, flights and chains, rack arms, and paddles or suction tubes and sludge pumps.

Flow equalization typically occurs in a separate tank. The flow at the waste water plant is subject to travel times in the collection system, collection system design, and pump station sizing. In general, larger collection systems use pump stations to lift the waste water to the treatment facility. The pumps are typically placed on variable-frequency drives in an attempt to provide a consistent flow. The system of variable-frequency drives and pumps, however, fails in low- and high-flow conditions. The pumps must be designed for peak hourly flows and centrifugal pumps have minimal turn-down capabilities.

These treatments and processes each require their own mechanical equipment and supporting infrastructure, resulting in higher capital costs to develop the system, increased maintenance, and higher energy costs. Further, the necessary supporting infrastructure requires a large amount of space to develop a traditional waste water treatment system. Thus, there is a need to develop a waste water treatment system wherein the treatment processes are performed in a single tank, which uses less energy, requires fewer construction materials, and takes up less space, while at the same time offering improved BOD reduction and a uniform flow to downstream processes.

Parent U.S. patent application "Primary Equalization Settling Tank", Ser. No. 12/177,553, now U.S. Pat. No. 7,972,505, discloses method and apparatus for providing these primary treatment functions. The system comprises a single primary settling tank that performs grit removal, flow equalization, primary clarification, and fine screening. A flow measurement device is located on the discharge side of the primary settling tank to measure the actual effluent flow from the primary settling tank. Further, an air blower may be provided to aerate the wastewater in the primary settling tank to prevent the wastewater from becoming septic.

The prior art wastewater treatment system also includes at least one sludge withdrawal hopper, a scum trough, a fine screen, and a discharge mechanism. In one embodiment, the discharge mechanism includes a driven decanter, which operates on a pivot and has a maximum operating height of one foot below the wall of the primary settling tank. The fine screen may be attached directly to the intake of the driven decanter. The height of the driven decanter is adjustable to match the actual effluent flow to a target flow by varying immersion of the decanter in the tank. The driven decanter may further include an actuated valve and a source of compressed air to pressurize the driven decanter to defoul the fine screen when the actuated valve is closed. The driven decanter may further include a source of potable or non-potable water to backwash the fine screen when the actuated valve is closed.

In another embodiment of the prior art invention, the discharge mechanism includes a floating decanter. The fine screen may be attached directly to the intake of the floating decanter, which is attached to a discharge pipe by a flexible hose. The discharge pipe includes an actuated valve, adjustable to match the actual effluent flow to a target flow. The discharge pipe may also include a source of compressed air ahead of the actuated valve to pressurize the driven decanter to defoul the fine screen when the actuated valve is closed. In a further embodiment, the discharge pipe may include a source of potable or non-potable water ahead of the actuated valve to backwash the fine screen when the actuated valve is closed.

In a further embodiment of the prior art invention, the discharge mechanism includes a fixed discharge pipe, and the fine screen is mounted vertically around the discharge pipe.

The '553 prior art disclosure further provides a method for treating wastewater in a single primary settling tank, comprising the steps of grit removal, fine screening, flow equalization, and primary clarification. The method further comprises using a flow measurement device on the discharge side of the primary settling tank and adjusting a discharge mechanism operationally connected to the flow measurement device to match the actual effluent flow rate to a target flow rate.

In the prior art system, the influent is discharged into the tank at a single, unspecified point, and no provision is made for distributing the influent within the tank. Thus, solids can build up non-uniformly on the tank walls and the sloping tank bottom. Further, no mechanical or hydraulic means is providing for assisting movement of accumulated solids toward the sludge trough at the bottom of the tank. Thus, removal of solids from the tank walls and bottom can require significant operator input.

What is needed in the art is an improved self-flushing system for a waste water primary equalization settling tank wherein waste water influent is distributed laterally and substantially uniformly across the width of the tank; wherein grit and other solids are removed by settling at a plurality of locations in the process; and wherein the gravitational hydraulic force of waste water influent is employed to flush accumulated solids from wall and bottom surfaces of the tank toward a sludge trough at the bottom of the tank.

It is a principal object of the invention to improve the self-flushing capability of a primary waste water treatment tank.

BRIEF SUMMARY OF THE INVENTION

Briefly described, the present Influent Feed System (IFS) directs and distributes the energy given to the influent liquid by gravity to scour the surface of the tank walls and the inclined tank base and to move the scoured solids to a sludge trough, also referred to herein as a sludge hopper. This scouring action takes place preferentially during periods of low liquid levels in the tank because the height of falling liquid from a influent distributor to the surface of the liquid in the tank is large; the cross section of the liquid in the tank is minimal, and thus higher influent velocities are created; the liquid mass within the tank is at the lowest level, so inertia of the influent flow is greater than that of the liquid in the tank; and the liquid volume in the tank is low, thus increasing the percent solids in the sludge.

Preferably, the system comprises two identical, adjacent tanks sharing a common influent distribution apparatus wherein either or both of the single tanks is in use at any given time and wherein each tank is sized to accommodate all but the very highest expected flows. A crossover passage allows excessive flows into the first tank to overflow into the second tank for identical treatment therein. The tank in use will be substantially empty on numerous occasions each day during low flow periods that occur as a result of diurnal flow patterns. If the flow pattern deviates from the design conditions, the influent flow can be diverted to the adjacent tank to create a low liquid level in the operating tank. Thus, a low tank level can occur naturally or may be induced by the operator via manual adjustment of influent sluice gates or automatically via controls.

The IFS in each tank has first and second Influent Feed Troughs (IFTs) disposed transversely of the longitudinal dimension of the tank and mounted to the tank end walls at opposite ends of the tank, which placement directs solids towards a central sludge hopper in the tank bottom. A central sludge hopper reduces the horizontal distance the settled solids must travel. Thus, the influent liquid is divided into two streams that enter the tank from opposite ends of the tank and collide at or near the sludge hopper. This collision results in turbulence and thus reduced stream velocities. Preferably, the system includes capability to adjust the influent flow volume to each end, which provides some field control as to where the collision takes place and its affects.

The IFTs extend over the width of the tank to provide scouring of the entire end wall and floor surface. The flow to each feed trough may be adjustable to provide the level of scouring that the operator deems necessary.

Each IFT has a sump with a valved discharge piped directly to the sludge trough. Further, the floor of each IFT is sloped downward towards the sump which facilitates draining of solids from the IFT by manually or automatically opening the valve in the IFT sump during low liquid levels, which directs these solids via an outlet pipe to the sludge trough for removal from the tank.

An overflow passage is located above the IFTs to allow influent to spill into the adjacent IFT of the second tank as may be needed to be distributed and treated therein in the same manner as in the first tank. No operator attention is required, as the overflow passage is simply an opening in the common wall between the first and second tanks above the level of the IFTs.

During normal operation of the system, the liquid level in the tank will rise above the tops of the IFTs. This is desirable for solids to settle during this phase. As the liquid depth increases in the tank, the liquid cross section increases, the liquid mass increases, and the distance between the inlet and the liquid surface decreases. All three of these result in lower influent velocities and thus increased settling.

BRIEF DESCRIPTION OF THE SEVERAL VIEWS OF THE DRAWINGS

The foregoing and other objects, features, and advantages of the invention, as well as presently preferred embodiments thereof, will become more apparent from a reading of the following description in connection with the accompanying drawings in which:

FIG. 1 is a schematic plan view of a self-cleaning influent feed system in accordance with the present invention;

FIG. 2 is an elevational cross-sectional view of the system shown in FIG. 1, taken along line 2-2;

DETAILED DESCRIPTION OF THE INVENTION

Figure 3:
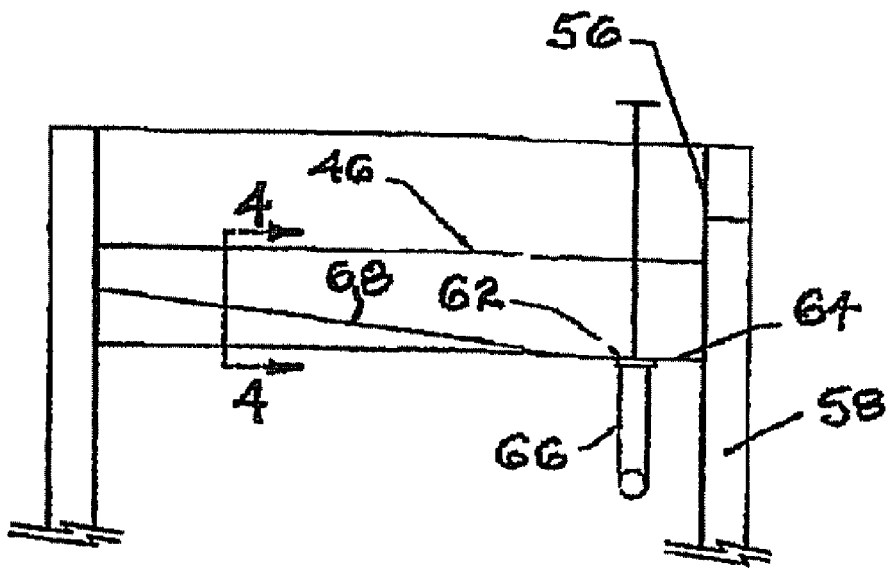
FIG. 3 is an elevational cross-sectional view of the system shown in FIG. 1, taken along line 3-3.
Figure 4:
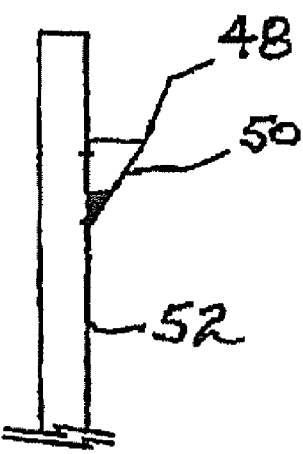
FIG. 4 is an elevational cross-sectional view of the system shown in FIG. 1, taken along line 4-4 in FIG. 3.

Referring to FIGS. 1 through 4, a system 10 for the primary treatment of wastewater streams (including grit removal, flow equalization, fine screening, flow measurement, and primary clarification) comprises at least one tank 12 and preferably two identically-equipped mirror-image tanks 12 as shown in FIG. 1. The following discussion deals primarily with only one of the two tanks 12 but should be taken as applying equally to both tanks 12 except as noted.

The overall treatment of waste water influent is substantially as disclosed in the parent '553 application. A flow measurement device 14 is located on the discharge side of the primary settling tanks 12 to measure the actual effluent flow from the primary settling tank. Further, an air blower (not shown) may be provided to aerate the waste water 16 in the primary settling tank to prevent the waste water from becoming septic.

The waste water treatment system also includes at least one sludge trough 18, a scum trough (not shown) as in the prior art, a fine screen 20, and a discharge mechanism. In one embodiment, the discharge mechanism includes a decanter 22 driven by a motor 24 to raise and lower the decanter as may be desired for flow control or cleaning. Decanter 22 operates on a pivot 26 joint in outflow pipe 28 and has a maximum operating height of one foot below the top of the wall of the primary settling tank 12. The height of the driven decanter is adjustable to match the actual effluent flow to a target flow by varying immersion of the decanter in the waste water 16. The driven decanter 22 may further include an actuated valve (not shown) and a source of compressed air (not shown) to pressurize the driven decanter to defoul the fine screen. The driven decanter may further include a source (not shown) of potable or non-potable water to backwash the fine screen. Waste water 16 has an operational depth range 17.

The present invention is directed to an improved self-cleaning influent feed system 30 for use in primary waste water treatment system 10.

Still referring to FIGS. 1 through 4, influent flow 32 is pumped from a pump/lift station (not shown) to systems 10 and 30. Influent pipe 34 discharges into a grit chamber 36 positioned near the top of the tank. Influent flow exits grit chamber 36 through either of two sluice gates 38 and enters a flow distribution box 40. The discharge volume from flow distribution box 40 is adjustable using flow control valves 42.

The adjusted flow travels via gravity through discharge pipes 44 to one or both influent feed troughs (IFTs) 46 located at opposite ends of the tank. IFTs 46 may be disposed either longitudinally of tank 12 or transversely, as shown in FIG. 1. The influent flow then rises in each fed IFT 46 until it spills uniformly across the length of the smooth rounded weir 48 of the IFT 46. A first portion of the influent liquid flows down the exterior face 50 of the IFT 46 to the wall 52, down wall 52 to the inclined base slab 54 and towards the sludge trough 18. A second portion of the influent feed having dense solids may free fall to base slab 54 and be directed towards sludge hopper 18 via the liquid coming down the face of wall 52. This liquid is then discharged via gravity through screened decanter 22, trapping the solids in the tank. If the flow rate of the liquid influent exceeds the discharge rate, the liquid level will rise. An overflow 56 is located at an engineered distance from the top of the common wall 58 separating tanks 12. Overflow 56 is positioned above the IFTs so that the overflow is uniformly distributed across the tank.

The influent pump station sending flow to a system 10 does not require a VFD (Variable Frequency Drive) as system 10 provides flow equalization, which reduces the capital cost of the pump controls and increases energy efficiency by approximately 2% as the electrical power is not going through a VFD. The influent pumps must have a capacity to meet peak hourly flows. The influent pipe will typically be sized to provide velocities of 3 to 7 fps in feed pipe 34. If the velocities are excessive, the force main can be increased in diameter at the system inlet to reduce velocity into the grit chamber.

System 10 preferably comprises two tanks 12 to provide redundancy to accommodate operational flexibility for flocculation/pH adjustments/etc. and additional volume that may occur during Peak Day flows.

Having grit chamber 36 at the top of the tank allows collected grit to be conveyed by gravity to a grit separation process (not shown). When no grit separation process is provided, the grit can be discharged into sludge trough 18 via drain 60 and valve 61 in the bottom of grit chamber 37, and from there it is removed. Sludge accumulation has an operating range 63.

A sluice gate 38 is provided for each tank 12. These gates can be manually or automatically operated to start or stop flow to the tank. Automatic operation can divert flow at specific phases of the operation to the adjacent tank. Such applications may include flocculation processes where coagulants are added and allowed to settle in a quiescent tank. The precipitated coagulated sludge/solids is removed via sludge trough 18 and the supernatant through decanter 22 while the adjacent tank 12 is processing the next quantity of influent. During sludge removal wherein the solids are flushed to sludge trough 18, influent flow is stopped and the tank contents are discharged via the sludge trough.

A mud valve 62 located in the base of each IFT sump 64 or a ball valve (not shown) on discharge pipe 66 from the sump 64 is manually operated to remove solids from the IFT. Each tank has two IFTs 46 mounted to the opposing end walls 52. The influent liquid enters the sump 64 and rises up until it spills over the entire length of IFT weir 48 in sheet flow into the tank. Each weir 48 is level so the influent flow is distributed uniformly across the entire IFT. The water left in each IFT transports the heavier dense solids directly to the sludge trough when the drain valve 62 is opened. The floor 68 of each IFT is sloped toward its respective drain valve 62 and sump 64.

From the foregoing description, it will be apparent that there has been provided an improved self-cleaning influent feed system for use in primary waste water treatment system. Variations and modifications of the herein described system, in accordance with the present invention, will undoubtedly suggest themselves to those skilled in this art. Accordingly, the foregoing description should be taken as illustrative and not in a limiting sense.

What is claimed is:

1. An improved self-flushing system for a primary equalization settling tank system, wherein said primary equalization settling tank system includes a settling tank, said self-flushing system comprising:
   a) a grit settling chamber disposed at a first elevated position within said settling tank for receiving waste water liquid influent;
   b) at least one influent feed trough extending across a dimension of said settling tank at a second elevation below said first elevation and in hydraulic communication with said grit settling chamber,
   wherein said influent feed trough is disposed substantially horizontally and is provided with an overflow weir for sheet flow of said liquid influent flow into said settling tank, and
   wherein said influent feed trough is formed and positioned such that a first portion of said liquid influent may flow from said weir along an inclined face of said influent feed trough and thence to an adjacent wall of said settling tank, and a second portion of said liquid influent may cascade directly from said weir into said settling tank;
   c) a bottom slab in said settling tank for receiving said first and second portions as fed by gravity; and
   d) a sludge trough for receiving influent sludge from said bottom slab, said sludge trough being disposed adjacent said bottom slab in an opening in said settling tank for removal of accumulated sludge.

2. A self-flushing system in accordance with claim 1, wherein said primary equalization settling tank system includes substantially identical first and second settling tanks, wherein each of said first and second settling tanks is provided with:
   a) at least one influent feed trough extending across a dimension of said settling tank,
   wherein said influent feed trough is disposed substantially horizontally and is provided with an overflow weir for sheet flow of said liquid influent flow into said settling tank, and wherein said influent feed trough is formed and positioned such that a first portion of said liquid influent may flow from said weir along an inclined face of said influent feed trough and thence to an adjacent wall of said settling tank, and a second portion of said liquid influent may cascade directly from said weir into said settling tank; and b) a bottom slab in said settling tank for receiving said first and second portions as fed by gravity.

3. A self-flushing system in accordance with claim 2 further comprising a hydraulic connection between said first and second settling tanks.

4. A self-flushing system in accordance with claim 3 wherein said hydraulic connection is an overflow passage.

5. A self-flushing system in accordance with claim 2, wherein said first and second settling tanks share a common grit chamber and a common sludge trough.

6. A self-flushing system in accordance with claim 1, further comprising:
   a) a distribution box disposed between said grit chamber and said influent feed trough; and
   b) a movable sluice gate disposed between said grit chamber and said distribution box.

7. A self-flushing system in accordance with claim 1, further comprising:
   a) a sump formed in said influent feed trough; and
   b) a valve disposed in said sump and in communication with said sludge trough.

8. A self-flushing system in accordance with claim 7, wherein a floor of said influent feed trough is inclined toward said sump.

9. A self-flushing system in accordance with claim 1, wherein said tank dimension is selected from the group consisting of transverse and longitudinal.

10. A self-flushing system in accordance with claim 1, comprising a plurality of said influent feed troughs.

11. A self-flushing system in accordance with claim 10, wherein said system comprises first and second influent feed troughs disposed respectively transversely of opposing ends of said settling tank, and wherein said bottom slab comprises first and second portions disposed respectively under said first and second influent feed troughs, and wherein said sludge trough is disposed centrally of said settling tank between said first and second bottom slab portions.

12. A system for the primary treatment of a wastewater influent stream, comprising:
   a) a settling tank;
   b) an influent pipe;
   c) an effluent pipe;
   d) apparatus for measuring the rate of flow of liquid through said effluent pipe;
   e) apparatus for collecting influent in said tank and for conveying said collected influent to said effluent pipe;
   f) apparatus for varying the flow rate of collecting and conveying to match a target effluent flow rate;
   g) a grit settling chamber disposed at a first elevated position within said settling tank for receiving said liquid influent;
   h) at least one influent feed trough extending across a dimension of said settling tank at a second elevation below said first elevation and in hydraulic communication with said grit settling chamber, wherein said influent feed trough is disposed substantially horizontally and is provided with an overflow weir for sheet flow of said liquid influent flow into said settling tank, and wherein said influent feed trough is formed and positioned such that a first portion of said liquid influent may flow from said weir along an inclined face of said influent feed trough and thence to an adjacent wall of said settling tank, and a second portion of said liquid influent may cascade directly from said weir into said settling tank;

i) a bottom slab in said settling tank for receiving said first and second portions as fed by gravity; and
   j) a sludge trough for receiving influent sludge from said bottom slab, said sludge trough being disposed adjacent said bottom slab in an opening in said settling tank for removal of accumulated sludge.

* * * * *